2 Sheets--Sheet 1.
J. R. McPHERSON.
Stock-Car.
No. 161,807.
Patented April 6, 1875.
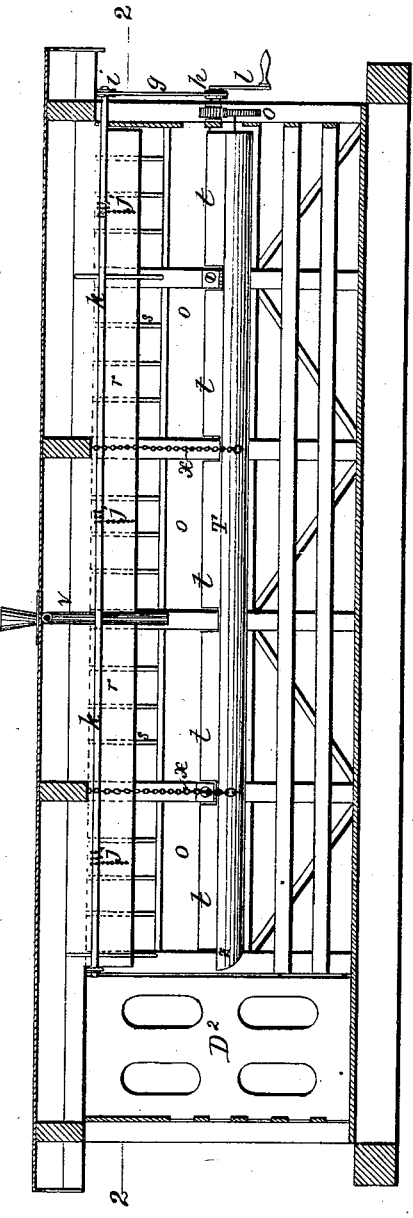
FIG I
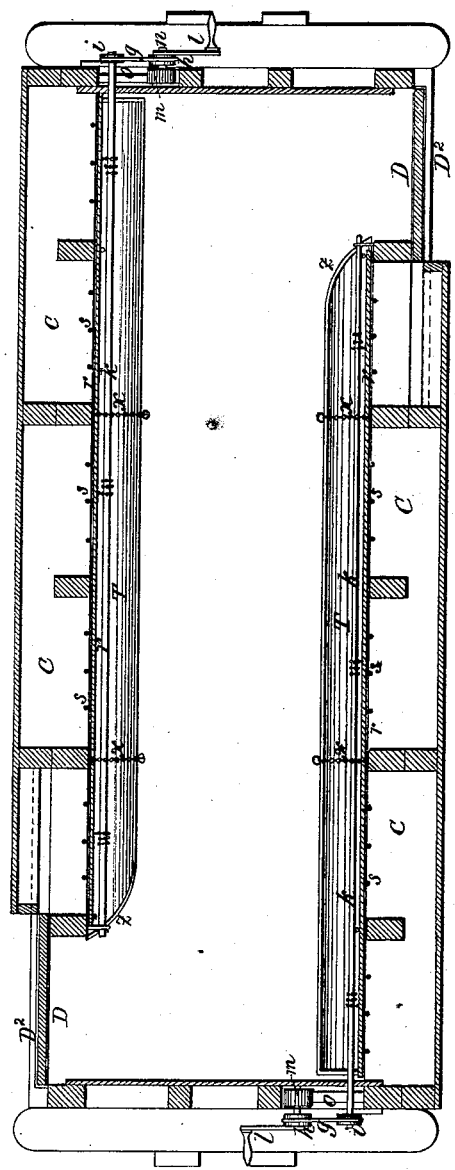
FIG II
WITNESSES
John E. Laing
J. H. Rutherford
INVENTOR
John R. McPherson
By Johnson & Johnson
his Attys.
THE GRAPHIC CO. PHOTO-LITH. 39 & 41 PARK PLACE, N.Y.

2 Sheets--Sheet 2.
J. R. McPHERSON.
Stock-Car.
No. 161,807. Patented April 6, 1875.
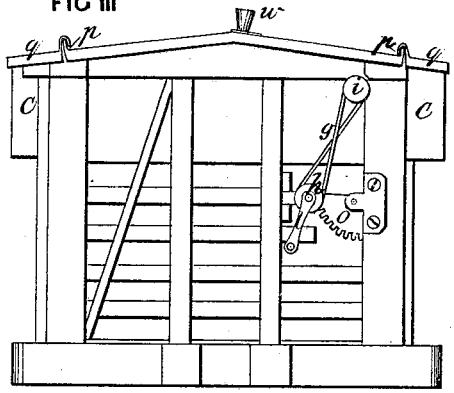
FIG III
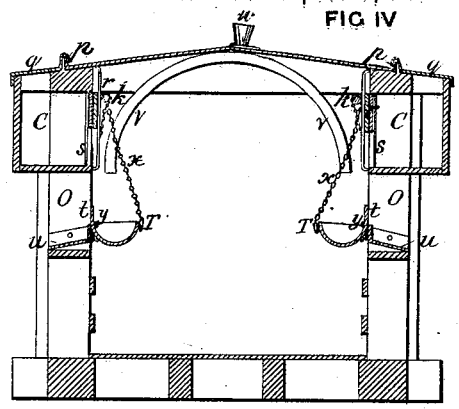
FIG IV
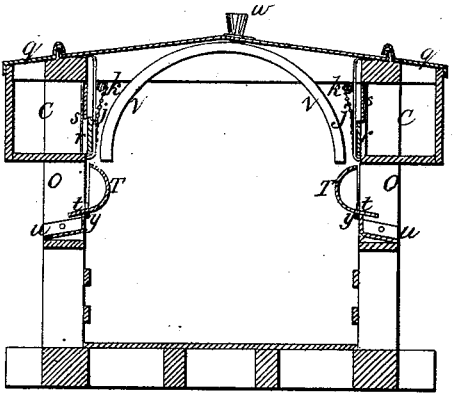
FIG V
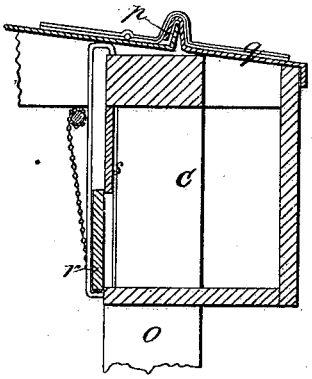
FIG VII
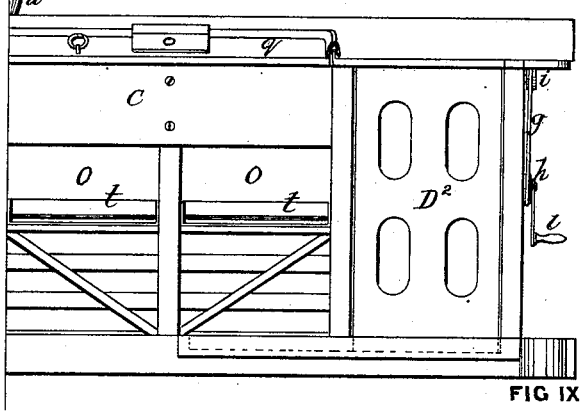
FIG VI
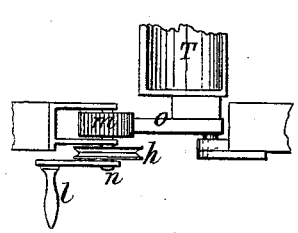
FIG VIII
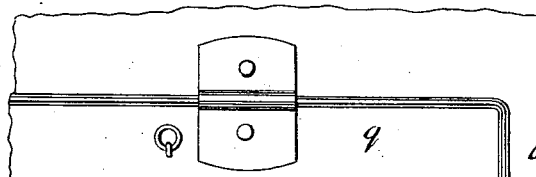
FIG IX
WITNESSES
John E. Laing
J. A. Rutherford
INVENTOR
John R. McPherson
By Johnson and Johnson
his Attys.
THE GRAPHIC CO. PHOTO-LITH. 39 & 41 PARK PLACE, N.Y.

UNITED STATES PATENT OFFICE.

JOHN R. McPHERSON, OF JERSEY CITY, NEW JERSEY.

IMPROVEMENT IN STOCK-CARS.

Specification forming part of Letters Patent No. 161,807, dated April 6, 1875; application filed March 20, 1875.

*To all whom it may concern:*

Be it known that I, JOHN R. MCPHERSON, of Jersey City, in the county of Hudson and State of New Jersey, have invented certain new and useful Improvements in Stock-Cars; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to railway-cars for transporting cattle, mules, and horses, and to means for feeding and watering such live stock, and otherwise caring for the same during long journeys, without unloading or delaying it.

The first part of my invention has reference to the supply of water and air, and at the same time to the preservation of the animals from undue exposure. Capacious and strong water-troughs, preferably of boiler-iron, are arranged on either side, extending from doorways in the sides at the respective ends of the car; and longitudinal openings adapted to accommodate Texan and other long-horned cattle, and to admit a free supply of air while open, are provided immediately above the troughs. The troughs are attached by hinges, so as to be adapted to be lowered and elevated at will, and water sheds or chutes are provided within the wall-openings, to co-operate with the troughs for discharging the waste-water outside of the car and clear of the floor, when the troughs are emptied, which is accomplished by elevating them. The elevated troughs serve to close the wall-openings, measurably, from wind and weather, and still give ample ventilation; to discharge all remaining water or other substance, after the cattle are through drinking, to the outside of the car, and thus prevent freezing in cold weather; to form a pad or shield to prevent the cattle from being injured on the rump by contact with the sides of the car. The ends of the troughs are beveled, so as not to project at the doors, to prevent the animals striking them in entering.

The second part of the invention has reference to the supply of hay or fodder, and to the protection of the same. A spark and water proof crib or feed-box is provided over each trough, with a vertical rack within the car. The racks are closed or masked, except during the feeding time, by sliding covers. The supply-doors are formed by sections of the roof, and the joints are made spark and water tight by overlapping edges on the doors and erect flanges on the contiguous parts, as hereinafter described.

The third part of the invention consists in mechanism for lowering by a positive force, and elevating, the heavy long troughs with facility from the ends of the cars, and for simultaneously operating the sliding rack-covers, to expose the feed when the troughs are lowered, and vice versa. Spur-sectors are attached to the ends of the troughs, and are meshed by pinions on short parallel shafts, which are driven by hand-cranks, to depress the troughs by force against the pressure of the animals. The same shafts operate to drive, through bands and pulleys, a pair of windlass-shafts, which are connected by cords or chains to the rack-covers.

Figure 1 is a vertical longitudinal section of the body of a stock car, illustrating this invention; Fig. 2, a horizontal section of the same on the lines 2 2, Fig. 1. Fig. 3 is an end elevation of the car-body. Fig. 4 is a vertical transverse section, showing the troughs turned down; Fig. 5, a similar view, showing the troughs turned up to empty them and close the wall-openings; Fig. 6, a side view of the door portion of the car; Fig. 7, an enlarged section of the feed-box and its cover, showing the crib masked; Fig. 8, a top view of the trough elevating and depressing device, and Fig. 9, a plan of a portion of the crib-cover.

The trucks of this improved stock-car and appurtenances may be of any preferred description, and the body, to the construction and furnishing of which the present invention has reference, may be built of the usual materials and proportions, and of any approved mode, as regards merely mechanical details.

Two doorways, D D, are provided in the sides of the car at its respective ends, so as to accommodate the feeding and watering apparatus, in the manner hereinafter described, and these are furnished with external sliding doors $D^2$. It has been found that by the employment of this arrangement of doorways the animals can be loaded with facility, and readily made to arrange themselves with heads alternately in opposite directions, and as close as may be desired, to as to prevent interference between the animals, and to equally distribute the load. Any system of stalls, barriers, or stanchions may be employed, if preferred. Troughs T, of abundant capacity, extend along the respective sides of the car, at proper height, from the doorways to the opposite ends. These troughs are by preference made of boiler-iron, so as not to be crushed by the animals, and their ends $z$ at the doors are beveled, as shown in Figs. 1 and 2, so as not to project, and any injury to the animals which might result from striking the ends of the troughs is thus prevented. The troughs are attached to the car-sides by hinges $y$, which adapt them to be lowered to horizontal positions, as shown in Fig. 4, or to be elevated, as shown in Fig. 5. Stay-chains $x$, extending from the walls to rings at the outer edges of the troughs, may assist in supporting them in effective positions, as illustrated, so as to prevent sagging between the ends. A central funnel, $w$, and pipes $v$ $v$ leading therefrom, as shown in Figs. 4 and 5, provide for filling the troughs from the roof. Longitudinal openings O are provided in the sides of the car above the troughs, and water sheds or chutes $u$, preferably of sheet metal, are attached within the same at bottom, being constructed with flanges at their inner edges, and inclined to discharge outward clear of the floor. The troughs are emptied by elevating them, and are provided with flanges $t$, to overlap those on the water-sheds during this time, to conduct the contents into or onto the water-sheds. The discharge of the waste water outside of the car is thus insured, and the floor is thus kept dry, or comparatively dry. While the troughs are lowered the openings O accommodate the horns of cattle, so as to permit them to drink with comfort. They serve also to admit a free supply of air and light while the animals are being watered and fed. They are closed by the elevated troughs, so as to exclude dust, &c., and to protect the animals from wind and weather. Above the openings O cribs or feed-boxes C are formed, the same being provided with convenient racks $s$ on the inside, through which the animals have access to hay or fodder therein when the racks are exposed. Sliding covers $r$ close or mask the racks when lowered. The ends, outer sides, and bottoms of the cribs are close, and their tops are formed by hinged sections $q$ of the roof, constituting supply-doors. The inner edges and ends of these doors or covers are struck up, so as to overlap erect flanges $p$ on the contiguous portions of the roof, to form spark and water tight joints. Spark and water proof cribs or boxes are thus formed for the preservation of the feed.

Owing to the arrangement of parts as above described there are but two troughs, and one end of each of these extends to one end of the car. This permits operating the troughs from the respective platforms, as herein proposed. The mechanism by which this is accomplished is shown most clearly in Figs. 1, 2, 3, and 8.

Sector-racks or cogged sectors $o$ are attached to the troughs concentric with their hinges, and are supported outside by journal-bearings. Short parallel shafts $n$ are supported adjacently in opposite bearings, and carry pinions $m$, which mesh with the cogged sectors. Hand-cranks $l$ at their outer ends provide for rotating the shafts $n$, and by turning these in their proper directions the troughs are lowered by the force of the gearing, or elevated with facility, the requisite power being thus readily applied. Light longitudinal windlass-shafts $k$, at or near the tops of the car, are connected at both ends and intermediately to the rack-covers $r$ by cords or chains $j$. These windlass-shafts have pulleys $i$ at their outer ends, above the trough-handling mechanism. Corresponding pulleys $h$ are provided on the short shafts $n$, to which the hand-cranks $l$ are attached, and these pulleys are connected by transmitting-bands $g$, so that the motion of the cranks by which the troughs are lowered shall raise the rack-covers and expose the racks, the reverse motion elevating the troughs and closing the cribs; or the trough and rack-cover may be elevated at the same time. The advantage of this method consists also in elevating and lowering the trough against the pressure of the animals.

Other devices or plans have been heretofore employed for the purpose of elevating the trough; but in those plans there has been no provision made for returning or readjusting the trough, in order that it properly function as a trough, except by depending upon its weight or gravity simply. This would not be sufficient, as the trough would at all times, while the car is loaded with animals, be more or less subjected to a pressure by the impingement of the animals against its edge or wall, rendering a force necessary to bring it back or depress it to its proper level.

It will be observed that in my invention I have made provision for this necessity by a force equal to every emergency; and I wish it to be understood that I claim as my invention not only the arrangement of the cogs and crank for the purposes expressed, but any other device by which the trough may be elevated and depressed at the will of the attendant by a force sufficient to overcome the pressure of the animals.

I have shown the feed-crib as being formed both upon the inner and outer sides of the car; but it is obvious that it may be formed either upon the inner or outer side entirely.

The following is claimed as new in this improvement in stock-cars, namely:

1. Combined with a cattle-car, longitudinal hinged troughs, to be emptied outward from the car in the act of elevating them, substantially as set forth.

2. A car-body having longitudinal openings O in its sides, in combination with hinged troughs T beneath openings O, and to operate to close them when elevated, substantially as set forth.

3. Water-sheds $u$ within openings O in the sides of the car, in combination with hinged troughs, adapted to empty outward when elevated, substantially as set forth.

4. The flanged water-sheds $u$, in combination with the troughs T, having overlapping flanges $t$ at their hinge edges, substantially as set forth.

5. The troughs T, having beveled ends $z$, in combination with a car-body having doorways D in the sides and at the ends, as and for the purpose set forth.

6. Spark and water proof cribs C, in combination with a stock-car body, substantially as set forth.

7. The sliding rack-covers $r$, in combination with the cribs C, having racks $s$ within the car, substantially as and for the purpose set forth.

8. The supply-doors or covers $q$ of the cribs, consisting of hinged sections of the car-roof, having overlapping edges, in combination with erect flanges $p$ on the contiguous portions of the roof, to exclude sparks and water, as set forth.

9. The combination, with the hinged troughs T, of apparatus for depressing them by a positive force, substantially as set forth.

10. The combination, with the hinged troughs T, of the concentric cogged sectors $o$, shafts $n$, pinions $m$, and hand-cranks $l$, for operating the same from the car-platforms, in the manner and for the purposes set forth.

11. The combination of the hand-cranks $l$, shafts $n$, pulleys $h$ $i$, bands $g$, windlass shafts $k$, and cords or chains $j$, for raising and lowering the sliding rack-covers from the platforms, substantially as set forth.

12. The shafts $n$, having hand-cranks $l$, pinions $m$, and pulleys $h$ thereon, in combination with the cogged sectors $o$ and the bands $g$, pulleys $v$, elevated windlass-shafts $k$, and cords or chains $j$, for simultaneously operating the hinged troughs and rack-covers, as set forth.

13. The combination, with the hinged troughs T, of the stay-chains $x$, as and for the purpose set forth.

In testimony that I claim the foregoing as my own I have affixed my signature in presence of two witnesses.

JOHN R. McPHERSON.

Witnesses:
A. E. H. JOHNSON,
J. W. HAMILTON JOHNSON.